US009922527B2

(12) United States Patent
Wallace et al.

(10) Patent No.: US 9,922,527 B2
(45) Date of Patent: Mar. 20, 2018

(54) MULTI-CONDITION SENSOR SYSTEMS

(71) Applicant: Kidde Technologies, Inc., Wilson, NC (US)

(72) Inventors: Steven Wallace, Raleigh, NC (US); Benjamin Codispoti, Raleigh, NC (US); Lawrence A. Coreth, Roanoke Rapids, NC (US); David W. Frasure, Wilson, NC (US)

(73) Assignee: Kidde Technologies, Inc., Wilson, NC (US)

( * ) Notice: Subject to any disclaimer, the term of this patent is extended or adjusted under 35 U.S.C. 154(b) by 0 days.

(21) Appl. No.: 15/223,526

(22) Filed: Jul. 29, 2016

(65) Prior Publication Data

US 2018/0033282 A1 Feb. 1, 2018

(51) Int. Cl.
  *G08B 21/18* (2006.01)
  *G01K 11/00* (2006.01)
  *G01M 3/26* (2006.01)

(52) U.S. Cl.
  CPC .............. *G08B 21/18* (2013.01); *G01K 11/00* (2013.01); *G01M 3/26* (2013.01)

(58) Field of Classification Search
  CPC ....................................................... G08B 21/18
  USPC ....................................................... 340/693.5
  See application file for complete search history.

(56) References Cited

U.S. PATENT DOCUMENTS

| 2,755,359 A * | 7/1956 | Rike .................. G01K 5/62 337/394 |
| 3,122,728 A | 2/1964 | Lindberg, Jr. |
| 4,006,329 A | 2/1977 | Hellman et al. |
| 4,038,613 A | 7/1977 | Fischer |
| 5,136,278 A * | 8/1992 | Watson .................. G08B 17/04 200/81.4 |
| 5,621,389 A | 4/1997 | Fellows |
| 5,691,702 A | 11/1997 | Hay |
| 9,153,400 B2 * | 10/2015 | Frasure .................. G08B 17/04 |
| 9,208,980 B2 * | 12/2015 | Wallace .................. H01H 35/26 |
| 9,342,969 B2 * | 5/2016 | Frasure ............... G08B 29/043 |
| 2009/0236205 A1 * | 9/2009 | Nalla ..................... G08B 17/04 200/81.4 |

(Continued)

FOREIGN PATENT DOCUMENTS

| GB | 2001464 A | 1/1979 |
| WO | WO-2015023176 A1 | 2/2015 |

*Primary Examiner* — Qutbuddin Ghulamali

(74) *Attorney, Agent, or Firm* — Locke Lord LLP; Daniel J. Fiorello; Scott D. Wofsy

(57) ABSTRACT

A multi-condition sensor, comprising a housing defining a component cavity, a pressure input tube disposed through the housing, a fault actuator disposed within the component cavity of the housing and in pressure communication with the pressure input tube through the housing, wherein the fault actuator is configured to extend and contract as a function of pressure from the pressure input tube, an alarm actuator disposed within the component cavity of the housing opposite the fault actuator and configured to be actuated by the fault actuator and to extend to a maximum fault position, and an adjustable alarm contact disposed on an opposite side of the alarm actuator within the component cavity and configured to be adjusted to a predetermined extension length from the housing to provide a predetermined alarm contact position.

15 Claims, 6 Drawing Sheets

(56) References Cited

U.S. PATENT DOCUMENTS

2011/0121977 A1\* 5/2011 Nalla ..................... G08B 17/04
340/584

\* cited by examiner

MULTI-CONDITION SENSOR SYSTEMS

BACKGROUND

1. Field

The present disclosure relates to sensor systems, more specifically to multi-condition sensor systems.

2. Description of Related Art

Typically, high temperature alarm switches for alerting a high temperature condition utilize two separate switches (e.g., a temperature switch and a fault switch) which have independent diaphragms to indicate either an alarm or fault condition. Each switch is connected to a common pressure line, which is typically hermetic and contains a minimum normal pressure that can be set to be equivalent to the pressure at a certain temperature (e.g., about −65° F., but can be lower or higher). This pressure is enough to deform a diaphragm in the fault switch so it will create electrical continuity between the deformable diaphragm and a contact pin as long as this minimum pressure exists in the system.

If there is a leak in the system or pressure otherwise reduces below the minimum set pressure, the diaphragm will no longer be in electrical contact with its contact pin, and a fault can be determined. When a core (e.g., hydride) and/or gas in the system are heated to a calibrated pressure, the force of the expanded gas will cause the deformable diaphragm of the temperature switch to engage the contact pin indicating an alarm condition. When the high heat condition is removed, the deformable diaphragm will start to go back into its normal formed configuration and move away from the contact pin creating an open electrical circuit indicating that the high heat source has been removed.

Traditionally, in manufacturing such sensors, there is a high scrap rate and switches cannot be determined on what part number they can be used on until after they are made. Therefore excessive amounts of switches are made.

Such conventional methods and systems have generally been considered satisfactory for their intended purpose. However, there is still a need in the art for improved sensor systems. The present disclosure provides a solution for this need.

SUMMARY

A multi-condition sensor includes a housing defining a component cavity, a pressure input tube disposed through the housing and a fault actuator disposed within the component cavity of the housing and in pressure communication with the pressure input tube through the housing. The fault actuator is configured to extend and contract as a function of pressure from the pressure input tube. The sensor includes an alarm actuator disposed within the component cavity of the housing opposite the fault actuator and configured to be actuated by the fault actuator and to extend to a maximum fault position, and an adjustable alarm contact disposed on an opposite side of the alarm actuator within the component cavity and configured to be adjusted to a predetermined extension length from the housing to provide a predetermined alarm contact position.

The fault actuator and the alarm actuator can include bellows. In certain embodiments, the fault actuator and the alarm actuator can be made of Inconel and/or any other suitable material.

Each of the fault actuator, the alarm actuator, and the adjustable alarm contact are conductive. In a normal operating condition, the fault actuator and the alarm actuator are in contact such that extension of the fault actuator due to pressure increase in the pressure input tube moves the alarm actuator toward the adjustable alarm contact, and such that contraction of the fault actuator causes the alarm actuator to extend toward the maximum fault position. In a high pressure condition in the pressure input tube (e.g., due to a high temperature of gas within the pressure input tube), the alarm actuator is moved by the fault actuator a sufficient distance to contact the adjustable alarm contact at the predetermined extension length. In a low pressure condition in the pressure input tube (e.g., due to a leak in the pneumatic tube, or that the tube has been severed or cut), the fault actuator is separated from the alarm actuator after the alarm actuator reaches the maximum fault position.

The housing can include a conductive portion (e.g., made of metal and/or any other suitable conductive material) and a non-conductive base (e.g., made of ceramic and/or any other suitable non-conductive material). The fault actuator can be attached to and in electrical communication with the conductive portion of the housing, for example. The alarm actuator can be attached to the non-conductive base, for example.

In certain embodiments, the alarm actuator can be attached to the non-conductive base via a metal washer (e.g., made of stainless steel and/or any other suitable conductive material that can be brazed to ceramic, for example) that is attached (e.g., brazed) to the non-conductive portion. Any suitable attachment of the metal washer is contemplated herein (e.g., copper brazing, adhering, welding, or otherwise). The sensor can further include a first electrode in electrical communication with the alarm actuator through the non-conductive base (e.g., via the metal washer) and a second electrode in electrical communication with the conductive portion of the housing.

The adjustable alarm contact can include a conductive threaded member (e.g., made of metal and/or any other suitable conductive material) disposed through the non-conductive base. The adjustable alarm contact can include a conductive calibration bellows disposed in the component cavity and configured to be contacted and actuated by the threaded member.

The threaded member can be disposed through the non-conductive base via a threaded insert that is brazed to the non-conductive base and configured to matingly receive the threaded member. The threaded insert can be made of stainless steel and/or any other suitable conductive metal.

The component cavity can be a hermetically sealed environment. The housing can include a sealed vent hole that was sealed after evacuation of the component cavity.

A multi-condition sensor electrical system for determining the state of the multi-condition sensor includes a first resistor in series with a power input line and a first electrode of the multi-condition sensor and a second resistor disposed in series with a power return line and a contact electrode and configured to receive current from the first resistor in a first sensor state. The system also includes a third resistor in parallel with a signal out line, wherein the signal out line and the third resistor are in series with the first resistor and the third resistor is disposed between the first resistor and the power return line, and a fourth resister in series between a second electrode of the multi-condition sensor and the power return line, and configured to receive current from the first resistor in a second sensor state and not to receive current from the first resistor in a third sensor state.

The first sensor state can be a high pressure condition that causes electrical communication between the first resistor and the second resistor within the sensor. The second sensor state can be a normal operating condition in which there is electrical communication between the first resistor and the fourth resister through the sensor. The third sensor state can be a fault condition where the first resistor is not in electrical communication with the fourth resistor.

The system can further include the multi-condition sensor. The multi-condition sensor can be any suitable embodiment, e.g., as described above. In certain embodiments, the fault actuator can be configured to bridge electrical communication between the first resistor and the fourth resistor in the normal operating condition. The alarm actuator can be configured to bridge electrical communication between the first resistor and the second resistor in the high pressure condition. In certain embodiments, the first resistor, the third resistor, and the signal out are in electrical communication via the alarm actuator.

The system can include a state determination device configured to receive electrical signals from the signal out line and the power return line and to determine the state of the multi-state sensor. In certain embodiments, the first resistor and the third resistor can have the same resistance values, and the second resistor can have less resistance value than the fourth resistor, wherein the fourth resistor can have less resistance value than the first resistor and the third resistor. Any other suitable resistance values are contemplated herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
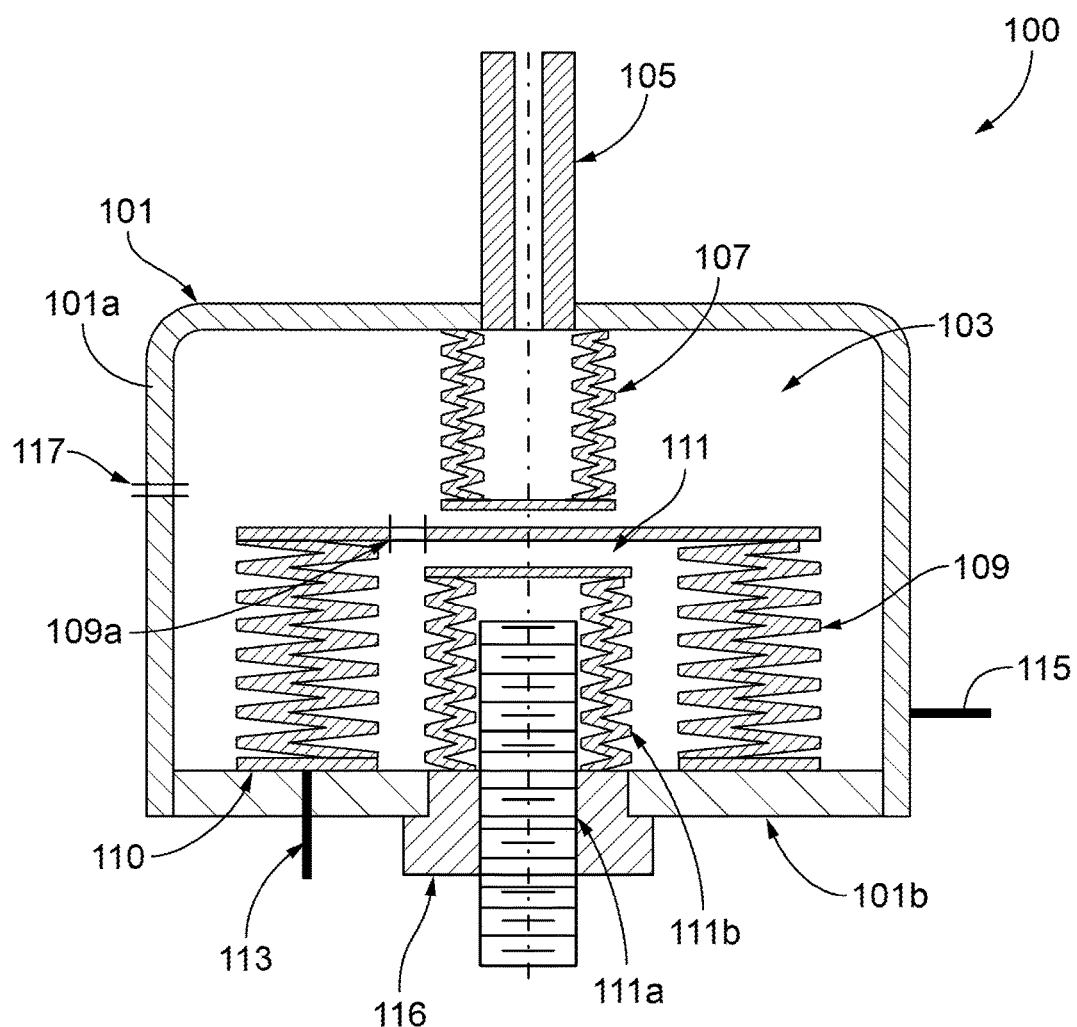
FIG. 1 is a cross-sectional schematic view of an embodiment of a sensor in accordance with this disclosure, showing a hermetically sealed housing which has been evacuated before the calibration process.

Reference will now be made to the drawings wherein like reference numerals identify similar structural features or aspects of the subject disclosure. For purposes of explanation and illustration, and not limitation, an illustrative view of an embodiment of a sensor in accordance with the disclosure is shown in FIG. 1 and is designated generally by reference character 100. Other embodiments and/or aspects of this disclosure are shown in FIGS. 2-9. The systems and methods described herein can be used to provide adjustable sensors (e.g., for overheat systems) with low scrap rate which improves functionality of the device as well as efficiency in manufacturing.

Referring to FIG. 1, a multi-condition sensor 100 includes a housing 101 defining a component cavity 103. The housing 101 can include a conductive portion 101a (e.g., made of metal such as stainless steel and/or any other suitable conductive material) and a non-conductive base 101b (e.g., made of ceramic and/or any other suitable non-conductive material).

The conductive portion 101a and the non-conductive base 101b can be attached together in any suitable manner. For example, the conductive portion 101 can be attached to the non-conductive base 101b using by brazing to the non-conductive base 101b. In another embodiment, a stainless steel washer or the like having the same diameter as the non-conductive base 101b can be brazed to the underside of the non-conductive base 101b, therefore allowing the conductive portion 101a to be welded to this washer on the underside of the non-conductive base 101b. Any other suitable attachment method is contemplated herein. Whatever means/method is used to attach the conductive portion 101a to the non-conductive base 101b, it can be done so to create a hermetic environment for the component cavity 103.

A pressure input tube 105 is disposed through the housing 101. The pressure input tube 105 is configured to receive fluid from a pneumatic detector (e.g., which can include titanium hydride and gas/gases for example). The pressure input tube 105 can be welded to the housing 101 (e.g., to the conductive portion 101a) in such a manner that a hermetic seal exists at the weld, for example.

A fault actuator 107 is disposed within the component cavity 103 of the housing 101 and in pressure communication with the pressure input tube 105 through the housing 101. The fault actuator 107 is configured to extend and contract as a function of pressure from the pressure input tube 105. As shown, in certain embodiments, the fault actuator 107 can be attached to and in electrical communication with the conductive portion 101a of the housing 101, for example. In certain embodiments, the fault actuator 107 can be welded to the inside of the housing 101 (e.g., on the conductive portion 101a) to provide a hermetic seal at the weld. When the pressure is increased in the pressure input tube 105, the fault actuator 107 can expand in length. When the pressure decreases, it can compress, or reduce in length.

The sensor 100 includes an alarm actuator 109 disposed within the component cavity 103 of the housing 101 opposite the fault actuator 107. The alarm actuator 109 is configured to be actuated by the fault actuator 107 and to extend to a maximum fault position (e.g., in the upward direction as shown). The alarm actuator 109 can be attached to the non-conductive base 101*b*, for example. In certain embodiments, the alarm actuator 109 can be attached (e.g., by welding) to the non-conductive base 101*b* via a metal washer 110 (e.g., made of stainless steel and/or any other suitable conductive material to be brazed to ceramic, for example) that is brazed to the non-conductive portion 101*b*.

The alarm actuator 109 can be welded to the metal washer 110. The welding of the alarm actuator 109 to the metal washer 110 can provide a hermetic seal at the weld. The alarm actuator 109 can be attached in any other suitable manner (e.g., directly welded, adhered, or otherwise attached).

Figure 2:
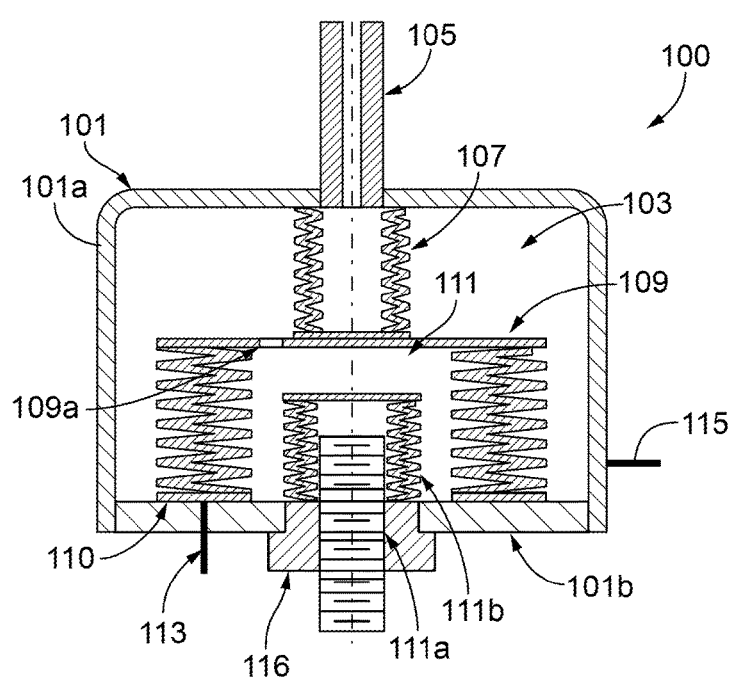
FIG. 2 is a cross-sectional schematic view of the embodiment of FIG. 1, shown having pressure applied to the fault actuator to contact the alarm actuator.
Figure 3:
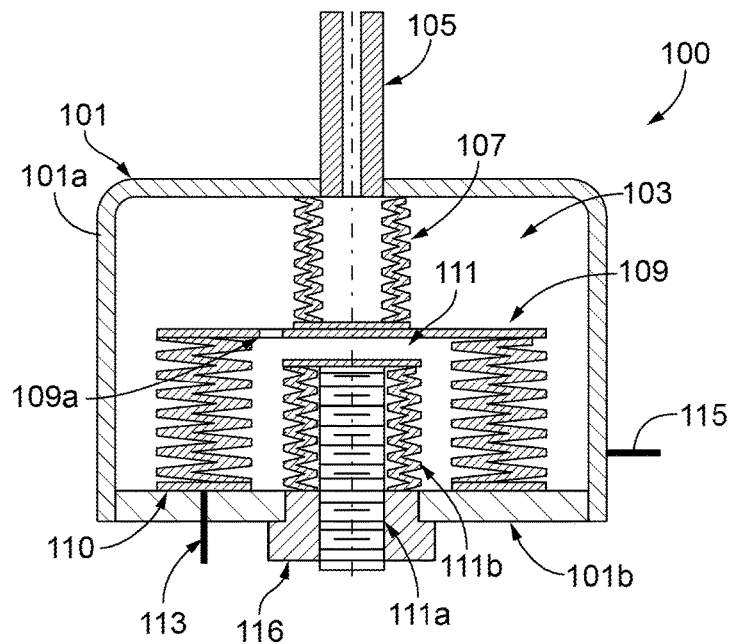
FIG. 3 is a cross-sectional schematic view of the embodiment of FIG. 1, shown having with the adjustable alarm contact set to the predetermined extension length and in a normal operating condition.

An adjustable alarm contact 111 is disposed on an opposite side of the alarm actuator 109 relative to the fault actuator 107 within the component cavity 103. The adjustable alarm contact 111 is configured to be adjusted (e.g., from a first position as shown in FIG. 2) to a predetermined extension length from the housing 101 to provide a predetermined alarm contact position (e.g., as shown in FIG. 3).

The fault actuator 107 and the alarm actuator 109 can include bellows as shown, for example. However, any other suitable actuator configuration is contemplated herein. In embodiments where the alarm actuator 109 is a bellows, the alarm actuator 109 can include a vent hole 109*a* to allow any gas from within the alarm actuator 109 to escape and/or enter, which allows free motion of the alarm actuator bellows. The material properties (e.g., resilience), thicknesses, and other dimensions/characteristics of the fault actuator 107 and the alarm actuator 109 can be selected to allow for a predetermined sensitivity of motion (e.g., for a suitable range of pressures). For example, for higher pressure applications, the bellows of fault actuator 107 and/or the alarm actuator 109 can be selected to be more resilient and resistant to deformation.

In certain embodiments, the fault actuator 107 and the alarm actuator 109 can include and/or be made of Inconel. Any other suitable material, conductive or otherwise, is contemplated herein.

Each of the fault actuator 107, the alarm actuator 109, and the adjustable alarm contact 111 are conductive such that when any of the each contact another, those contacting actuators are in electrical communication. It is understood that the fault actuator 107, the alarm actuator 109, and the adjustable alarm contact 111 need not be completely conductive or made of conductive material, only that conductive material exists on each to allow electrical communication there between.

Referring additionally to FIG. 3, in a normal operating condition, the fault actuator 107 and the alarm actuator 109 are in contact such that extension of the fault actuator 107 due to pressure increase in the pressure input tube 105 moves the alarm actuator 109 toward the adjustable alarm contact 111. Also, the contraction of the fault actuator 107 causes the alarm actuator 109 to extend toward the maximum fault position (e.g., as shown in FIG. 1). In certain embodiments, the normal operating pressure in the pressure input tube can be approximately 30 PSIA, but any suitable pressure is contemplated herein.

Figure 4:
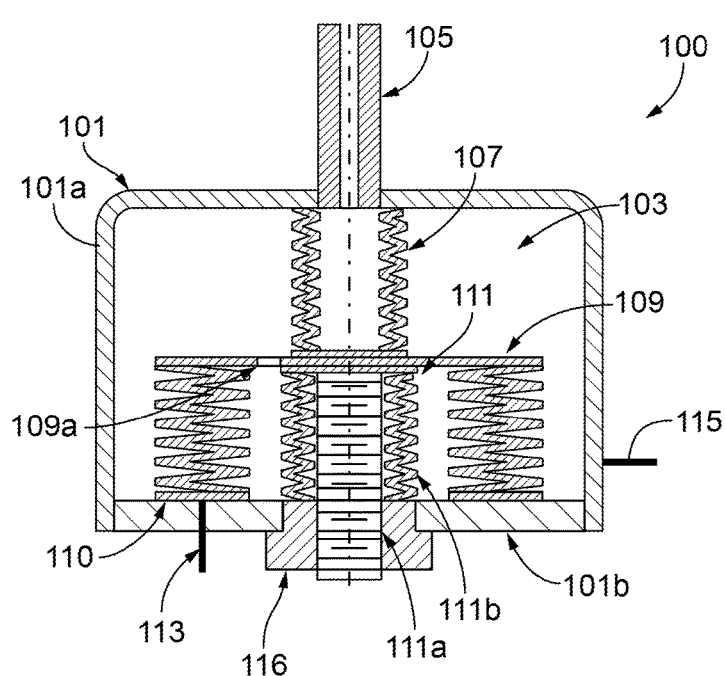
FIG. 4 is a cross-sectional schematic view of the embodiment of FIG. 1, shown in a high pressure/temperature/alarm condition.
Figure 5:
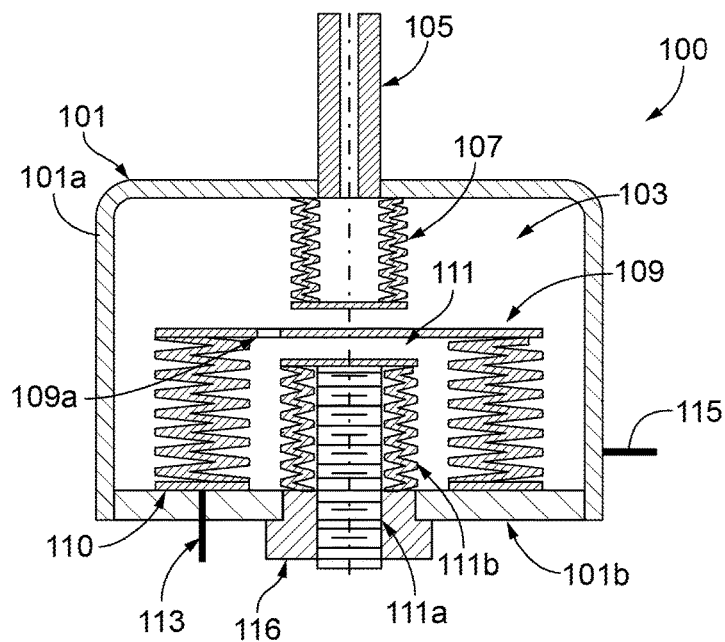
FIG. 5 is a cross-sectional schematic view of the embodiment of FIG. 1, shown in a low pressure/temperature/fault condition.

Referring additionally to FIG. 4, in a high pressure condition in the pressure input tube 105 (e.g., due to a high temperature of gas within the pressure input tube), the alarm actuator 109 is moved by the fault actuator 107 a sufficient distance to contact the adjustable alarm contact 111 at the predetermined extension length. Referring additionally to FIG. 5, in a low pressure condition in the pressure input tube (e.g., due to a leak in the pneumatic tube, or that the tube has been severed or cut), the fault actuator 107 is separated from the alarm actuator 109 after the alarm actuator 109 reaches the maximum fault position.

The sensor 100 can further include a first electrode 113 in electrical communication with the alarm actuator 109 through the non-conductive base 101*b* (e.g., via the metal washer 110). A second electrode 115 can be in electrical communication with the conductive portion 101*a* of the housing 101.

The adjustable alarm contact 111 can include a conductive threaded member 111*a* (e.g., made of metal and/or any other suitable conductive material) disposed through the non-conductive base 101*b*. The conductive threaded member 111*a* can act as and/or be connected to a third electrode, for example. The adjustable alarm contact 111 can also include a conductive calibration bellows 111*b* disposed in the component cavity 103 and configured to be contacted and actuated by the threaded member 111*a*. The calibration bellows 111*b* can be configured to isolate the threaded member 111*a* from the component cavity 103 to maintain a hermetic environment and prevent fluid leaking through the threads of threaded member 111*a*. Any other suitable way to seal the threaded member 111*a* to maintain a hermetic environment within component cavity 103 is contemplated herein (e.g., a suitable thread sealant).

In certain embodiments, the threaded member 111*a* can be disposed through the non-conductive base 101*b* via a threaded insert 116 that is brazed to the non-conductive base 101*b* and configured to matingly receive the threaded member 111*a*. The threaded insert 116 can be made of stainless steel and/or any other suitable material. It is also contemplated that the threaded insert 116 need not be metallic or conductive. The threaded insert 116 can be brazed into the non-conductive base portion 101*b*.

The threads utilized on the threaded member 111*a* and the threaded insert 116 can be selected to provide a predetermined fidelity required for the threaded member 111*a*. For example, the threads may range from about 56 to about 80 threads per inch depending upon the precision required in moving the calibration bellows 111*b* to come in contact with the alarm actuator 109. Any suitable thread count, pitch, or density is contemplated herein.

In certain embodiments, the calibration bellows 111*b* can be welded to the threaded insert 116. The welding of the calibration bellows 111*b* to the threaded insert 116 can provide a hermetic seal at the weld, for example. As appreciated by those skilled in the art, the entire component cavity 103 can be a hermetically sealed environment in certain embodiments. In certain cases, the component cavity 103 can be evacuated during or after assembly, which requires a gas path to allow the fluid inside component cavity 103 to evacuate. In certain embodiments, this can be accomplished with a vent hole that allows the creation of a predetermined partial or total vacuum within the housing 101. The vent hole can be sealed (e.g., via beam welding) after evacuation but before removal from the vacuum chamber. Therefore, in this regard, the housing 101 can include a sealed vent hole 117 that was sealed after evacuation of the component cavity 103.

The vacuum can minimize the effects of temperature on the fault actuator 107, for example, as appreciated by those having ordinary skill in the art. For example, in certain applications, the normal operating temperatures in which the detector housing may reside could be as high as 800° F. In such a case, the housing 101 can be hermetically sealed to keep moisture, fluids, and contaminates out of the housing 101 during normal operation. If the housing 101 were sealed with one atmosphere of pressure, the increasing pressure effects of high temperature could cause certain embodiments of the fault actuator 107 to compress. For example, the pressure increases due to high temperatures could cause the fault actuator 107 to compress and move away from making contact with the alarm actuator 109 causing a "false" fault condition by breaking the electrical contact between the second electrode 115 and the first electrode 113. A low pressure could also cause the fault actuator 107 to expand, thus compressing the alarm actuator 109 to make contact with the calibration bellows 111b causing a "false" alarm condition in certain embodiments.

To create the evacuated condition, the assembled housing 101, which has not yet been calibrated, can be placed in a sealed chamber where the atmospheric pressure is reduced to the required calculated/predetermined vacuum pressure. When the chamber is at the required vacuum pressure, the volume inside of the housing 101 will also be at that same pressure because the vent hole 117 has allowed the pressure inside of the detector housing to also be reduced. The vent hole 109a in the alarm actuator 109 allows the pressure in the hermetically sealed volume between the alarm actuator 109 and the calibration bellows 111b to also be at the same pressure as the housing volume. When the vacuum pressure is stabilized, the vent hole 117 is sealed (e.g., using Electron Beam Welding) while the housing 101 is still inside of the pressure chamber. Any other process for evacuating the housing 101 is contemplated herein. A calibration process can then be performed on the hermetically sealed housing containing the predetermined vacuum pressure.

When there is normal operating pressure in the pneumatic detector, the fault actuator 107 can be expanded in length to come in contact with the top of the alarm actuator 109. This contact can cause an electrical connection to occur between the second electrode 115, and the first electrode 113. This electrical connection represents the fault switch, indicating that there is pressure in the pneumatic detector, and everything is operating normally. As the pressure in the pressure input tube 105 continues to increase, the fault actuator 107 will retain contact with the top of the alarm actuator 109. If the pressure in the pressure input tube 105 decreases below the normal operating pressure, the fault actuator 107 will compress, or reduce in length, and pull away from the top of the alarm actuator 109. When this happens, the electrical contact between the second electrode 115 and the first electrode 113 will be lost indicating there is a fault in the system. For example, this could indicate that there is a leak in the pneumatic tube, or that the tube has been severed or cut.

Certain embodiments of sensor 100 (e.g., wherein each actuator 107, 109 are bellows) can be calibrated as follows. If an alarm pressure for a particular pneumatic detector design was 60 PSIA, then 60 PSIA can be applied to the pressure input tube 105 (e.g., at the state shown in FIG. 1). This action can cause the fault actuator 107 to expand, come in contact with the top of the alarm actuator 109, and continue to compress, or push down, the alarm actuator 109 (e.g., as shown in FIG. 2). When the pressure of 60 PSIA is stabilized, the threaded member 111a can be turned so it would come in contact with the inside top of the calibration bellows 111b and continue to be turned until the top of calibration bellows 111b comes in contact with the inside top of the alarm actuator 109. When the top of the calibration bellows 111b comes in contact with the inside top of the alarm actuator 109 an electrical contact will be established between the threaded member 111a and the first electrode 113. This electrical contact represents the alarm condition.

When this electrical contact occurs, the threaded member 111a is at the desired set-point. At this point any suitable method can be used to lock the threaded member 111a in place (e.g., with screw adhesive, spot welding, etc.) so the position of the threaded member 111a will not be altered during use by such things as shock and vibration.

As described above, embodiments include sensors that can be adjustable after manufacture and reduce the number of unique, tailor-made sensors to meet specific pressure requirements. Sensors can now be made without scrap due to adjustability to account for various required pressure variables, for example.

Figure 6:
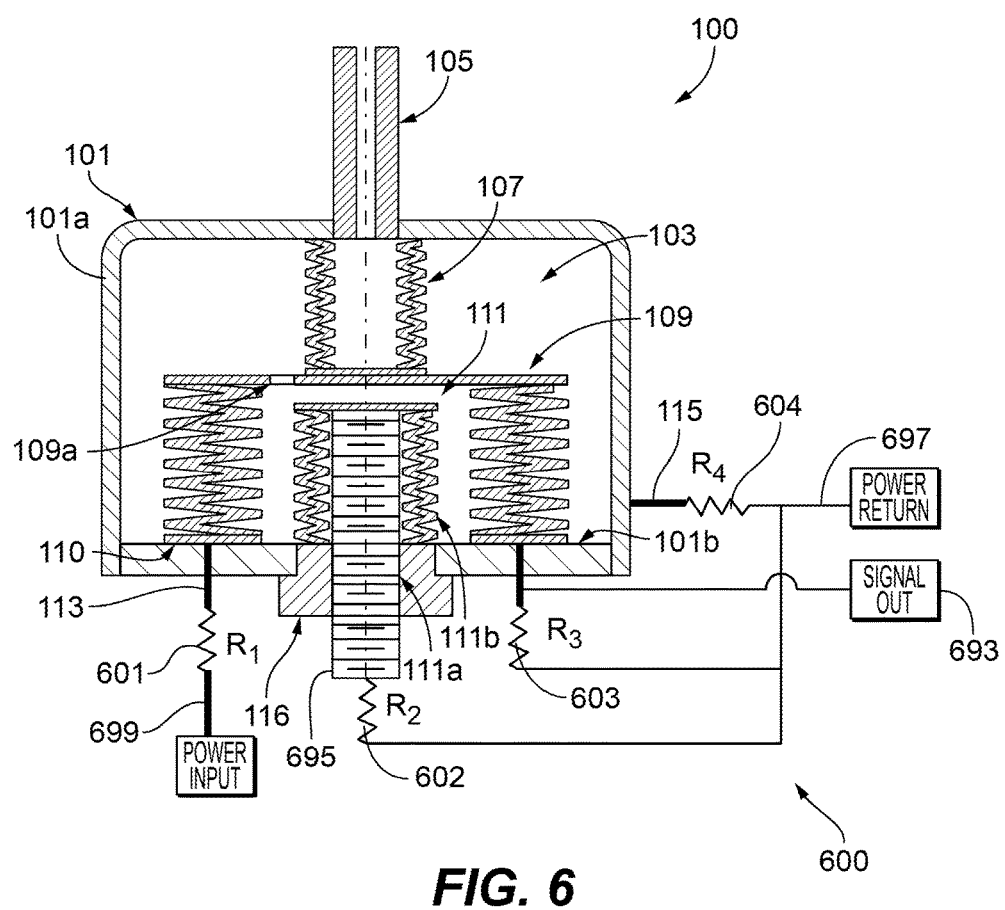
FIG. 6 is a cross-sectional schematic view of an embodiment of an electrical system connected to the embodiment of a sensor of FIG. 1, shown having pressure applied to the fault actuator to contact the alarm actuator, e.g., in a normal operating condition.

Referring to FIG. 6, a multi-condition sensor electrical system 600 for determining the state of the multi-condition sensor (e.g., sensor 100 as described above and/or any other suitable sensor) includes a first resistor 601 (with resistance R1) in series with a power input line 699 and a first electrode 113 of the multi-condition sensor. The system 600 includes a second resistor 602 (with resistance R2) disposed in series with a power return line 697 and a contact electrode 695 (e.g., threaded member 111a) and configured to receive current from the first resistor 601 in a first sensor state (e.g., as shown in FIG. 7).

Figure 8:
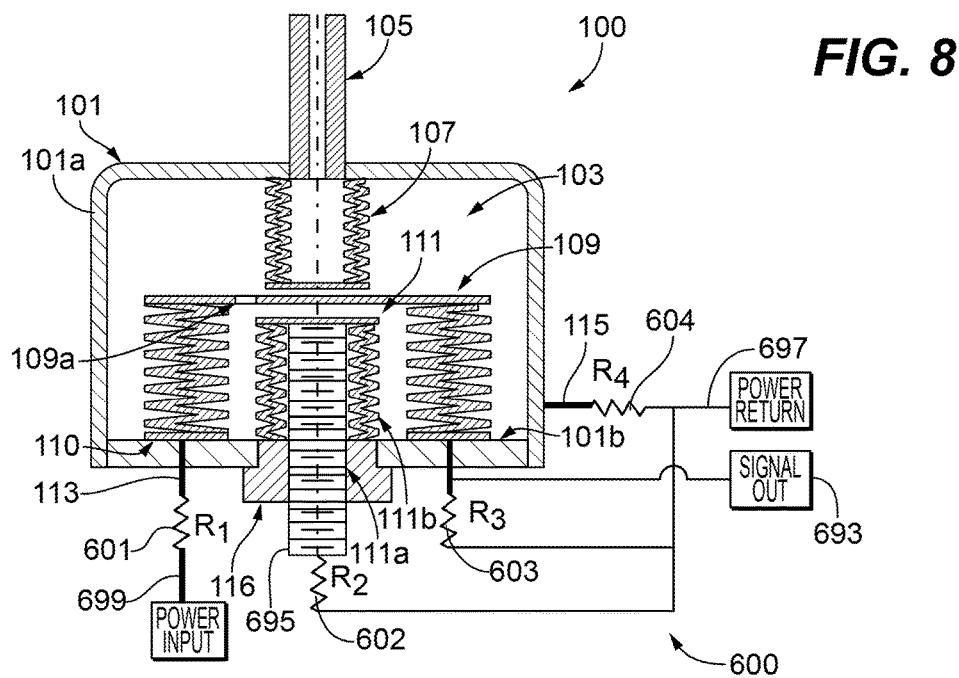
FIG. 8 is a cross-sectional schematic view of the embodiment of FIG. 6, shown in a low pressure/temperature/fault condition.

The system 600 also includes a third resistor 603 in parallel with a signal out line 693. The signal out line 693 and the third resistor 603 (with resistance R3) are in series with the first resistor 601. The third resistor 603 is disposed between the first resistor 601 and the power return line 697. The system 600 includes a fourth resister 604 (having resistance R4) in series between a second electrode 115 of the multi-condition sensor and the power return line 697 and configured to receive current from the first resistor 601 in a second sensor state (e.g., as shown in FIGS. 6 and/or 7) and not to receive current from the first resistor 601 in a third sensor state (e.g., as shown in FIGS. 8 and/or 9).

Figure 7:
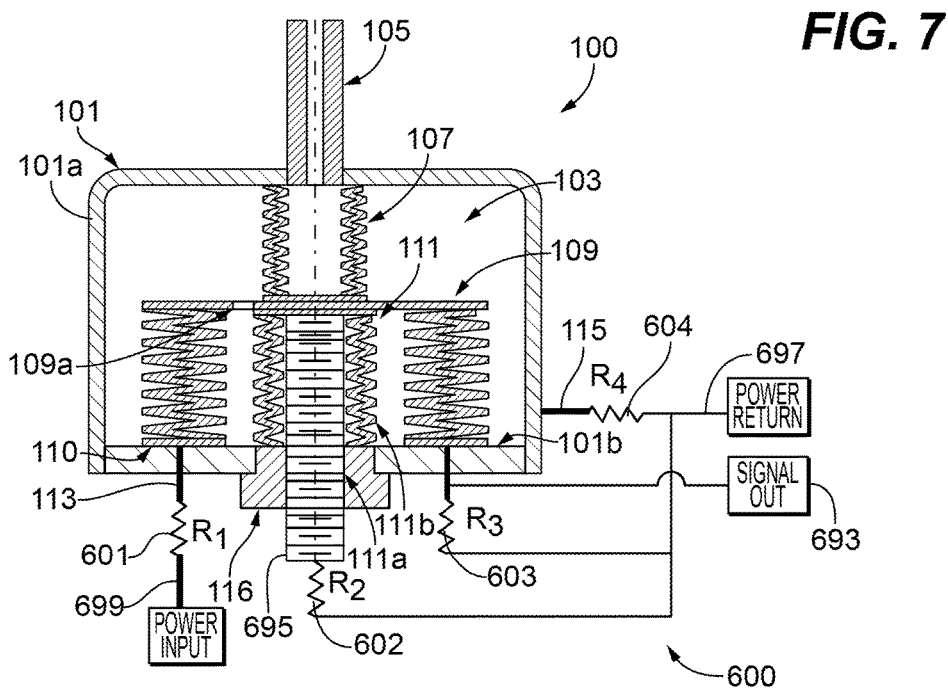
FIG. 7 is a cross-sectional schematic view of the embodiment of FIG. 6, shown in a high pressure/temperature/alarm condition.
Figure 9:
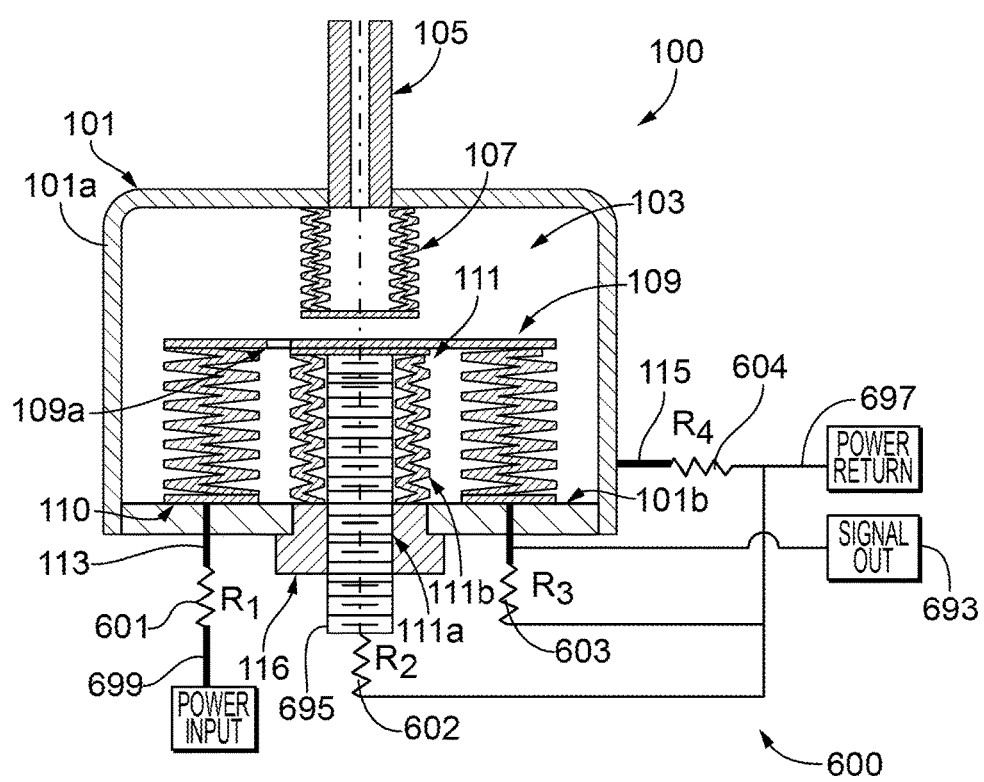
FIG. 9 is a cross-sectional schematic view of the embodiment of FIG. 6, shown in a low pressure/temperature/fault condition and having a contact fault.

Referring to FIG. 7, the first sensor state can be a high pressure condition that causes electrical communication between the first resistor 601 and the second resistor 602 within the sensor. Referring to FIG. 6, the second sensor state can be a normal operating condition in which there is electrical communication between the first resistor 601 and the fourth resister 604 through the sensor. Referring to FIGS. 8 and 9, the third sensor state can be a fault condition where the first resistor 601 is not in electrical communication with the fourth resistor 604.

In certain embodiments, the multi-condition sensor can be any suitable embodiment of a sensor 100 as described above. For example, the fault actuator 107 can be configured to bridge electrical communication between the first resistor 601 and the fourth resistor 604 in the normal operating condition. The alarm actuator 109 can be configured to bridge electrical communication between the first resistor 601 and the second resistor 602 in the high pressure condition. The first resistor 601, the third resistor 603, and the signal out 697 can be in constant electrical communication via the alarm actuator 109.

The system 600 can include a state determination device (e.g., a computer having a microprocessor) configured to receive electrical signals from the signal out line 693 and the power return line 697 and to determine the state of the multi-state sensor. In certain embodiments, the first resistor 601 and the third resistor 603 can have the same resistance values, and the second resistor 602 can have less resistance value than the fourth resistor 604. The fourth resistor 604 can have less resistance value than the first resistor 601 and the third resistor 603. Any other suitable resistance values are contemplated herein.

Wiring harnesses of a system (e.g., on an aircraft) can occasionally be damaged and can cause false signals to the monitoring controllers and incorrectly indicate the same three electrical connections described above. For example, the wiring harness could be damaged and cause the electrical wires in the harness for power input line 699 and threaded member 111*a* to be shorted together indicating that the sensor 100 is in a high temperature/pressure alarm condition. In such a case in an aircraft, the aircraft pilot would take action to try to correct the situation. Because the pilot cannot correct the false alarm, the pilot may declare an emergency and take unnecessary actions to correct the false situation.

Similarly, the wiring harness could be damaged and cause the electrical wires in the harness for power input line 699 and power return line 697 to be shorted together indicating that the detector is functioning normally, when it may actually be damaged and could fail to detect a valid fault condition. Or, the wiring harness could be damaged and cause the electrical wires in the harness for power input line 699 and power return line 697 to be open (not connected) indicating that the sensor 100 has a fault and not operating correctly. If a valid alarm condition then occurred, the pilot would be confused because there is a both a fault and an alarm coming from the same sensor, and could cause unnecessary actions to be taken.

Accordingly, an electrical system can be utilized as described above and a monitoring controller, such as a state determination device as described above, can be used to evaluate voltage outputs to perform discriminating functions that identify and verify the conditions of the sensor 100 and eliminate possible false conditions.

FIG. 6 shows the sensor 100 in its normal operating condition with the fault actuator 107 expanded to be touching the alarm actuator 109. In this case, the electrical voltage measured on the signal out line 693 would be the result of the voltage divider effect of the value of the parallel combination of R3 and R4, i.e. (R3||R4), then divided by the value of the parallel combination of R3 and R4, plus the addition of value R1, i.e. (R3||R4+R1), and that result multiplied by the input voltage "N". See below:

$$\text{Signal Out} = \frac{N(R3 \| R4)}{(R3 \| R4 + R1)} \quad \text{Note: } Rx \| Ry = \frac{1}{\frac{1}{Rx} + \frac{1}{Ry}}$$

FIG. 7 shows the sensor 100 in high pressure alarm condition. The fault actuator 107 has expanded further and is pushing the alarm actuator 109 downward to make contact with the calibration bellows 111*b*. In this case, the electrical voltage measured on the signal out line 693 would be the result of the voltage divider effect of the value of the parallel combination of R3, R4 and R2, i.e. (R3||R4||R2), then divided by the value of the parallel combination of R3, R4 and R2, plus the addition of value R1, i.e. (R3||R4||R2+R1), and that result multiplied by the input voltage "N". See below:

$$\text{Signal Out} = \frac{N(R3 \| R4 \| R2)}{(R3 \| R4 \| R2 + R1)}$$

FIG. 8 shows the sensor 100 in a first fault condition where the fault actuator 107 has pulled away from the alarm actuator 109 due to a leak in the pneumatic detector. In this case, the electrical voltage measured on the signal out line 693 would be the result of the voltage divider effect of the value of R3, i.e. (R3) divided by the value of R3 plus the value of R1, i.e. (R3+R1), and that result multiplied by the input voltage "N". See below:

$$\text{Signal Out} = \frac{N(R3)}{(R3 + R1)}$$

FIG. 9 shows the sensor 100 in a second fault condition where the alarm actuator 109 makes contact with the calibration bellows 111*b* due to a mechanical defect of the fault actuator 109, or calibration bellows 111*b*, or the threaded member 111*a*. In this case, the electrical voltage measured on the signal out line 693 would be the result of the voltage divider effect of the value of the parallel combination of R3 and R2, i.e. (R3||R2), then divided by the value of the parallel combination of R3 and R2 plus the addition of value R1, i.e. (R3||R2+R1), and that result multiplied by the Input Voltage "N". See below:

$$\text{Signal Out} = \frac{N(R3 \| R2)}{(R3 \| R2 + R1)}$$

Table 1 shows example resistor values for resistors 601, 602, 603, 604 (R1, R2, R3, and R4, respectively). Based on the example resistor values, the output voltage is shown for each of the sensor conditions. Accordingly, any condition of the sensor leads to a different voltage than the other conditions, allowing a determination of the state of the multi-condition sensor. The resistor values can be varied in any suitable manner to achieve the desired voltages for the output voltage.

TABLE 1

| Aircraft Input Voltage | Resistor Values (ohms) | | | | | Signal Output Voltage |
|---|---|---|---|---|---|---|
| (VDC) | $R_1$ | $R_2$ | $R_3$ | $R_4$ | Condition | (VDC) |
| 28 | 2,000 | 499 | 2,000 | 1,000 | FIG. 6 - Normal Operating | 7 |
| | | | | | FIG. 7 - Alarm Condition | 3.5 |
| | | | | | FIG. 8 - Fault Condition 1 | 14 |
| | | | | | FIG. 9 - Fault Condition 2 | 4.66 |

Therefore, if one or more output voltages (±a given tolerance) are not in accordance with the expected output voltages, then there is most likely a problem with the aircraft wiring that can be determined by the microprocessor. For example, if the power input line 699 is shorted to the signal out line 693 in the aircraft wiring harness, then the monitoring controller would be reading a typical aircraft voltage of 28 VDC, for example, which is an unexpected output voltage, or if the signal out line 693 was cut in the aircraft wiring there would be a zero VDC voltage on the signal output which is also an invalid output voltage. Any other state can be determined as a function of input voltage and output voltage by determining the expected voltage of the output based on the resistance values to the actual output.

Use of the electrical system 600 can also help the aircraft maintenance personnel identify the location of a fault. For example, if the monitoring controller reports a 28 VDC or a zero VDC output, then fault is most likely in the wiring harness. The first resistor 601 on the power input line 699 alters the aircraft input voltage so a 28 VDC output from the detector would not be possible, for example.

The methods and systems of the present disclosure, as described above and shown in the drawings, provide for sensor systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A multi-condition sensor, comprising:
a housing defining a component cavity;
a pressure input tube disposed through the housing;
a fault actuator disposed within the component cavity of the housing and in pressure communication with the pressure input tube through the housing, wherein the fault actuator is configured to extend and contract as a function of pressure from the pressure input tube;
an alarm actuator disposed within the component cavity of the housing positioned opposite the fault actuator and configured to be actuated by the fault actuator and to extend to a maximum fault position, wherein the maximum fault position is such that the alarm actuator cannot move further in a direction towards the fault actuator; and
an adjustable alarm contact disposed on an opposite side of the alarm actuator within the component cavity and configured to be adjusted to a predetermined extension length from the housing to provide a predetermined alarm contact position;
wherein each of the fault actuator, the alarm actuator, and the adjustable alarm contact are conductive,
wherein, in a normal operating condition, the fault actuator and the alarm actuator are in contact such that extension of the fault actuator due to pressure increase in the pressure input tube moves the alarm actuator toward the adjustable alarm contact such that contraction of the fault actuator causes the alarm actuator to extend toward the maximum fault position,
wherein, in a high pressure condition in the pressure input tube, the alarm actuator is moved by the fault actuator to contact the adjustable alarm contact at the predetermined extension length, and
wherein, in a low pressure condition in the pressure input tube, the fault actuator is separated from the alarm actuator after the alarm actuator reaches the maximum fault position.

2. The sensor of claim 1, wherein the fault actuator and the alarm actuator include bellows.

3. The sensor of claim 1, wherein the housing includes a conductive portion and a non-conductive base.

4. The sensor of claim 3, wherein the fault actuator is attached to and in electrical communication with the conductive portion of the housing.

5. The sensor of claim 4, wherein the alarm actuator is attached to the non-conductive base.

6. The sensor of claim 5, wherein the alarm actuator is attached to the non-conductive base via a metal washer that is brazed to the non-conductive portion.

7. The sensor of claim 5, further comprising a first electrode in electrical communication with the alarm actuator through the non-conductive base and a second electrode in electrical communication with the conductive portion of the housing.

8. The sensor of claim 5, wherein the adjustable alarm contact includes a conductive threaded member disposed through the non-conductive base.

9. The sensor of claim 8, wherein the adjustable alarm contact includes a conductive calibration bellows disposed in the component cavity and configured to be contacted and actuated by the threaded member.

10. The sensor of claim 9, wherein the threaded member is disposed through the non-conductive base via a threaded insert that is brazed to the non-conductive base and configured to matingly receive the threaded member.

11. The sensor of claim 10, wherein the threaded insert is made of stainless steel or Inconel.

12. The sensor of claim 10, wherein the non-conductive base is ceramic.

13. The sensor of claim 1, wherein the fault actuator and the alarm actuator are made of Inconel or stainless steel.

14. The sensor of claim 1, wherein the component cavity is a hermetically sealed environment.

15. The sensor of claim 14, wherein the housing includes a sealed vent hole that is sealed after evacuation of the component cavity.

* * * * *